United States Patent [19]

Hinrichs

[11] 4,106,330

[45] Aug. 15, 1978

[54] TENSION SENSOR

[75] Inventor: Donald R. Hinrichs, Richmond, Va.

[73] Assignee: Reynolds Metals Company, Richmond, Va.

[21] Appl. No.: 786,894

[22] Filed: Apr. 12, 1977

[51] Int. Cl.$^2$ ............................................. G01L 5/04
[52] U.S. Cl. ........................................ 73/37.7; 73/144
[58] Field of Search ................... 73/144, 37.7, 150 R, 73/159

[56] References Cited

U.S. PATENT DOCUMENTS

| | | | |
|---|---|---|---|
| 3,439,536 | 4/1969 | Cushman | 73/144 UX |
| 3,845,434 | 10/1974 | Carter | 73/144 X |

*Primary Examiner*—Jerry W. Myracle

*Attorney, Agent, or Firm*—Glenn, Lyne, Gibbs and Clark

[57] ABSTRACT

A device for measuring tension exerted upon a thin, flexible, elongated, plastic bubble. The device utilizes a cylindrical air-bearing and a flow of air to concentrically and symmetrically deflect a portion of the bubble. By measuring the static pressure within the channel defined by the air bearing and the bubble, the tension forces on the bubble side walls in the longitudinal direction may be computed from known mathematical relationships characterizing thin-walled pressure vessels. The device is particularly useful for sensing tension fluctuations about a norm where the bubble is continuously moving and of indefinite length under a controlled manufacturing process.

8 Claims, 4 Drawing Figures

TENSION SENSOR

BACKGROUND OF THE INVENTION

This invention relates generally to the use of an air-bearing to sense longitudinal tension exerted upon a thin, flexible, elongated plastic bubble which is continuously moving relative to the sensor. More particularly, this invention relates to a tension sensor suitable as a process control device in the manufacture of thin plastic film. Typically in the manufacture of such film, appropriate feed material at an elevated temperature is continuously extruded through an annular die, partially cooled and subsequently taken off by rollers downstream of the die. By pinching the partially cooled extruded film with the downstream rollers and pressurizing the space defined by the film between the die and the pinch rollers, a large bubble may be formed.

By selectively varying the tension exerted by the rollers on the hot extruded film bubble, the film may be partially oriented such that its mechanical properties are selectively varied. Further, it is important to have the capability to sense tension fluctuations about a norm selected to produce a film having relatively uniform orientation and predetermined selected properties. The present invention permits such fluctuations to be measured directly from the film material by utilizing a sensor having an air-bearing element.

An air-bearing having a porous element of sufficient permeability such that an air flow passing through the element will support a member moving over the effluent surface of the porous element is selected to carry out this invention. The flow of air uniformly emanating from the porous surface provides an air cushion that acts as a practically frictionless load-bearing surface. A more detailed discussion of this type air bearing is found in "Introduction to Engineering Controlled Porosity Products" and "Air Film Rolls" published by the Mott Metallurgical Corporation, Farmington Industrial Park, Farmington, Connecticut, Catalogs 1000 and 3000, respectively.

SUMMARY OF THE INVENTION

This invention includes an enclosure having an internal chamber, a porous and permeable wall section with a cylinderical outer surface adapted for passing a gas flow therethrough and a gas input extending from the inner surface of the enclosure to the outer surface, means for sensing static pressure at the surface of the porous wall section, and low inertia rotatable extensions mounted on either side of the enclosure. A convenient shape for the enclosure is disclosed in Mott's Catalog 3000, above referenced.

In using the device to sense tension exerted upon a thin, flexible, plastic bubble, a continuous and controlled flow of gas is passed into the internal chamber whereby the gas flow discharges through the porous and permeable wall section. Upon bringing the porous wall section into close proximity with the moving plastic bubble under tension, the gas flow is adjusted to concentrically and symmetrically deflect the bubble. Under this configuration, the static pressure differential across the deflected portion of the bubble is proportional to the tension exerted upon the bubble side walls in the longitudinal direction. Static pressure within the channel defined by the outer surface of the porous wall section and the deflected bubble side wall may be sensed by a probe having its intake opening at the surface of the porous wall section which is terminally connected to a pressure measuring means such as a manometer.

By the bubble having a longitudinal dimension substantially greater than the active radius of curvature of the porous wall section, longitudinal components of the tension in the bubble side wall may be measured by orienting the longitudinal axis of the porous section perpendicular to the line of tension component to be measured. Axial extension members are affixed to the porous section thereby taking advantage that the porous wall section may be small relative to the overall size of the assembly thus economizing with respect to fabrication of the assembly and to the volume of gas required in operation.

The static pressure differential across the concentrically and symmetrically deflected portion of the bubble may readily be used to determine the tension acting on the bubble side walls by applying well known mathematical relationships of engineering mechanics characterizing thin-walled pressure vessels. In addition to measuring absolute tension the device may be used to detect the relative magnitude and frequency of tension fluctuations about a desired tension norm, as for example in a manufacturing process susceptible to random fluctuations.

BRIEF DESCRIPTION OF THE DRAWINGS

The accompanying drawings show, for purposes of illustration only, a present preferred embodiment of the invention. In the drawings.

DESCRIPTION OF THE ILLUSTRATED EMBODIMENT

Figure 1:
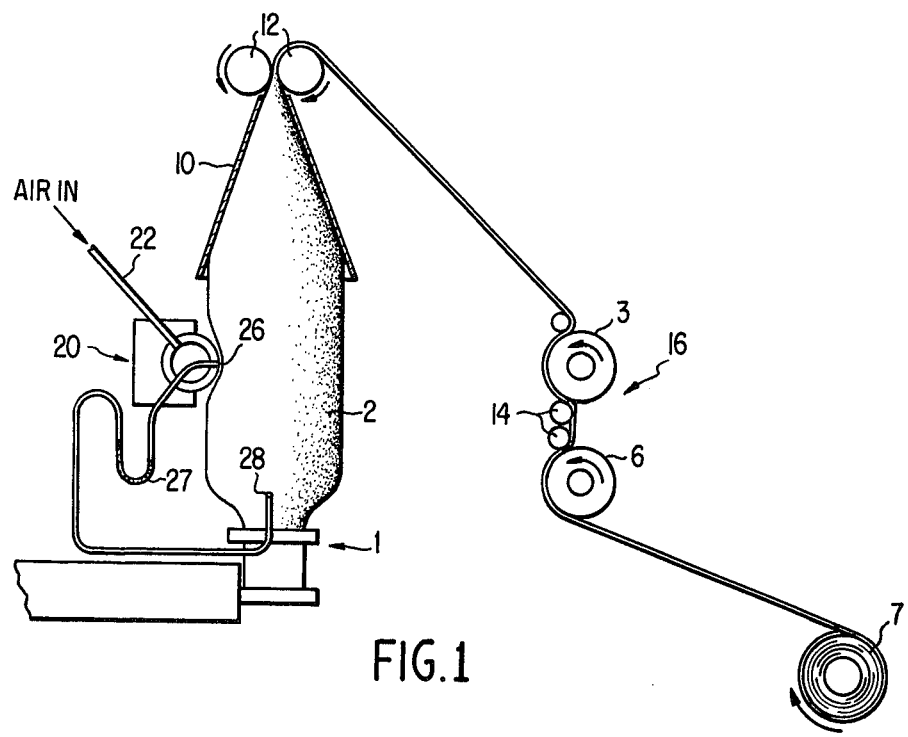
FIG. 1 of the drawing is a front elevational view, schematic in nature, and taken partially in vertical cross section to illustrate the practice of the present invention.

Referring now more particularly to the drawings, FIG. 1 shows the general arrangement of the present invention in connnection with an extruder for extruding film as disclosed, for example in the Marsh et al U.S. Pat. No. 3,891,737 issued June 24, 1975 and assigned to the common assignee of the present invention.

Referring now to FIG. 1 of the drawings, an extrusion die is schematically illustrated at 1. This die may be of the type shown and described in Hinrich's U.S. Pat. No. 3,752,635 issued on Aug. 14, 1973 and assigned to the common assignee of the present invention, wherein a plastic bubble emerges at the outlet of the die and is inflated and ventilated by continuously circulating gases with the temperature of the gases being controlled as they enter and leave the bubble so that it does not adversely effect the temperature of the melt in the die. Reference to the Hinrich's patent may be had for the details of a useful die construction. The polymeric film 2 which emerges therefrom is controlled by suitable guide means 10 toward a part of nip rolls 12 which are driven at the same speed.

Thereafter, the film is directed or conveyed toward a roll stand indicated generally at 16 wherein a plurality of guide rolls 14 entrain the plastic film about a series of rolls consisting of a stretch roll 3, and a chill roll 6. From there the plastic film is directed to a wind-up roll 7 which provides a suitable core for the plastic film. For purposes of this invention, the roll stand and the core form no part of this invention and are deemed to be conventional in the art.

The apparatus of this invention (not to scale in comparison to the bubble) used to measure the tension in the film 2 is shown generally by the numeral 20 in FIG. 1. The tension measuring and monitoring device consists of a differential manometer 27 having a probe 28 on the interior of the bubble 2 and a probe 26 in the air gap, more clearly shown in FIG. 2.

Figure 2:
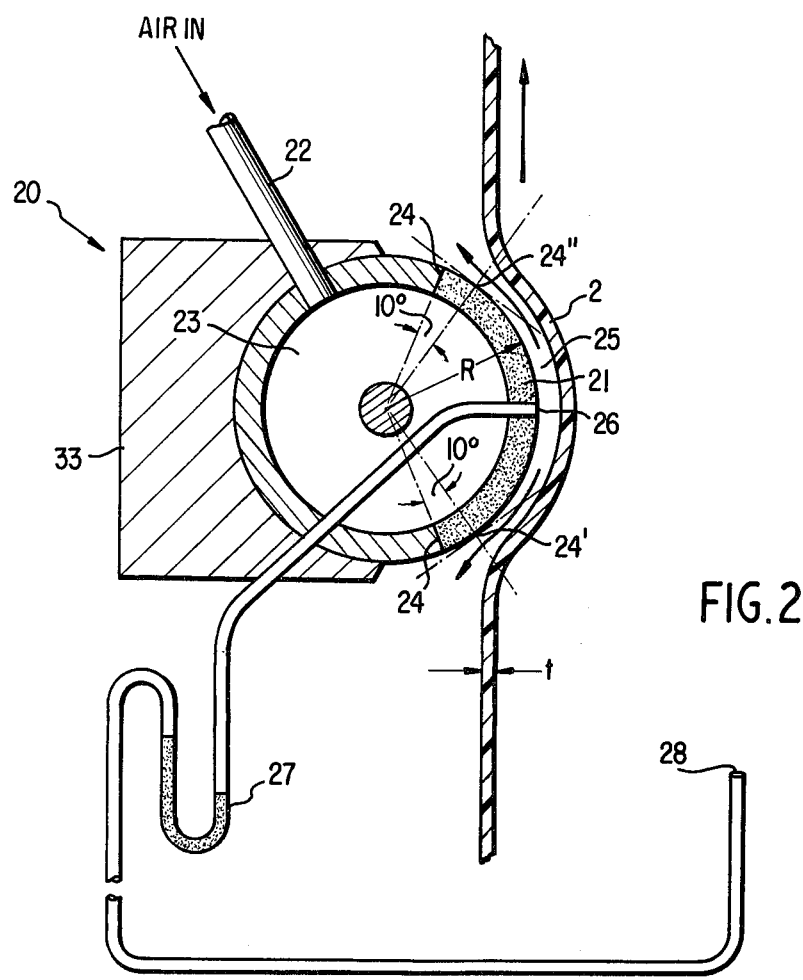
FIG. 2 is a schematic detail cross-sectional drawing of the hollow cylindrical porous element in contact with a bubble illustrating the operation of the invention.

Operation of the tension measuring apparatus 20 is illustrated in FIG. 2. A porous and permeable cylindrical element 21 receives a flow of gas through an intake channel 22 whereby the closed internal chamber 23 is pressurized and the gas flow is discharged through the permeable wall of the permeable element 21. To sense tension exerted upon a thin, flexible, elongated bubble such as the member 2 as shown, the porous element 21 is urged slightly against the member. A selected gas flow emanating from the finely porous surface of the element 21 concentrically and symmetrically deflects the member 2 such that a discharge channel 25 is established between the element 21 and the deflected member 2. Static pressure within the discharge channel 25 is sensed at the surface of the porous element 21 by a pressure tap or probe 26 which extends inwardly through the chamber 23 and is terminally connected to a pressure measuring means such as a manometer. In order to measure the pressure on the inside of the member 2 a differential manometer 27 may be used with its other probe 28 extending into the inside of the bubble 2. The static pressure differential across the deflected portion of the member 2 may be directly related to the tension being sensed. This relationship is discussed below.

As shown in FIG. 2, it is desirable to maintain an additional angle of about 10° of active porous surface between the start of the porous element at 24 and the tangential point 24' where the film departs from a relatively straight path to a cylindrical path around the porous element 21. Also, it is desirable to maintain an angle of about 10° of active porous surface between the other outer extremity 24 of the porous element 21 and the tangential point 24" where the film departs from its cylindrical path around the porous element 21 and back to its relatively straight path of travel.

Figure 3:
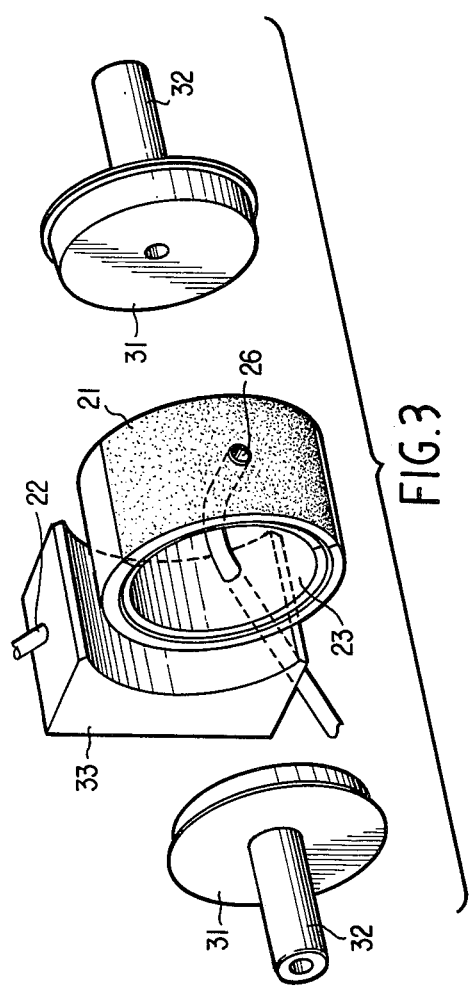
FIG. 3 is an exploded perspective of the porous element with end closures adapted to receive rotatable axial extensions and a mounting block for affixing the element to a frame.

In FIG. 3, the porous element 21 is shown in exploded perspective. The porous portion of element 21 has the shape of a hollow, open-ended semi-cylindrical segment of a cylinder. End seal caps 31 are inserted in the open ends of the element 21 to enclose the internal chamber 23. The seal caps 31 as shown have axial protrusions 32 adapted for receiving rotatable axial extension members. The porous element 21 is affixed in a mount 33 diametrically opposed to the probe 26. The mount 33 serves the purposes of providing for the attachment of the porous element 21 to a support frame. The cylindrical member, except for the porous element, is effectively masked by being non-porous between points 24—24 adjacent the mount 33 which economizes operation of the device by lessening the gas flow input requirements.

Figure 4:
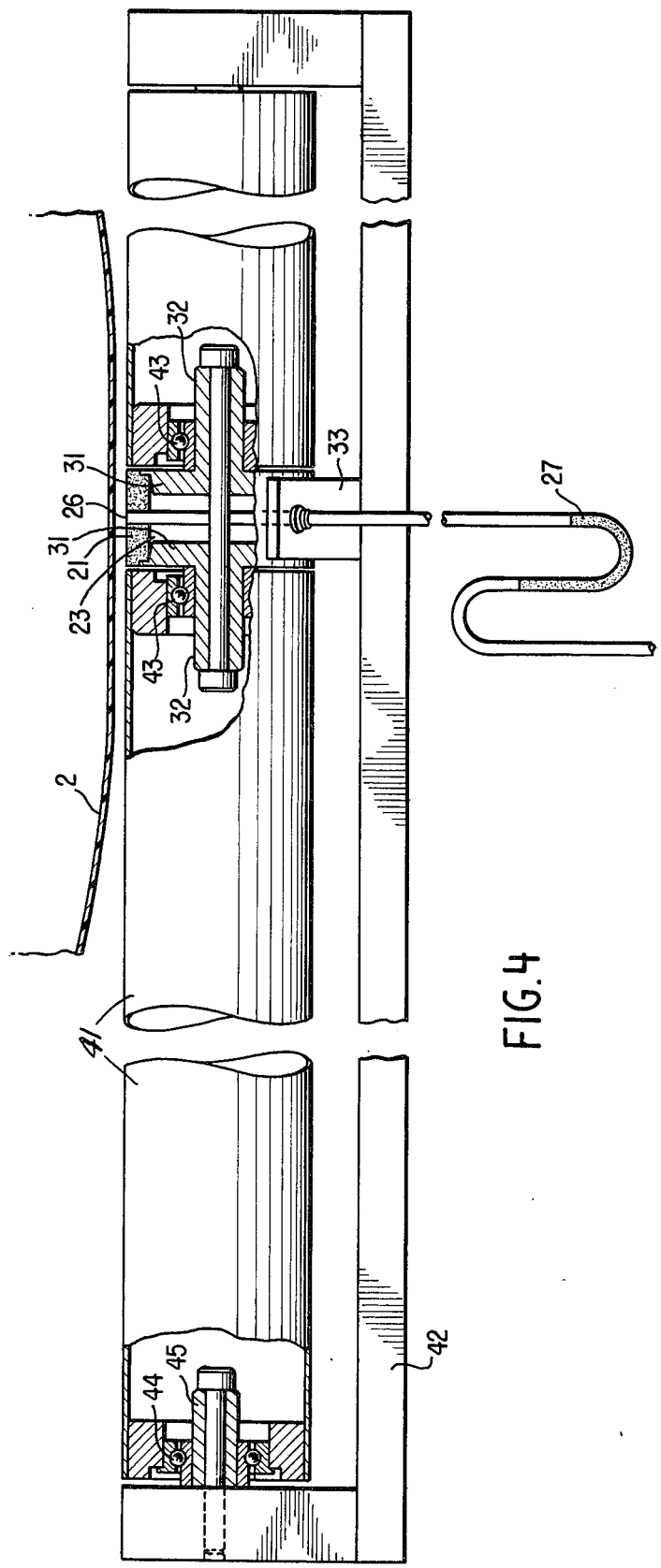
FIG. 4 shows in section the porous element with rotatable axial extensions assembled in a frame, wherein the sensor is in contact with a bubble.

In FIG. 4, the complete assembly is shown. Rotatable axial extensions 41 are mounted on bearings 43. The opposite end of each extension member 41 is supported by bearings 44 and shafts 45 on frame 42. The porous element 21 supported by mount 33 is assembled on frame 42 as shown. The basic purpose of the axial extensions 41 is to facilitate relatively frictionless motion between the sensor and the thin film of indefinite length being conveyed by the roller system in a manufacturing operation and to prevent the tearing of the film 2. It is desirable to use hollow rollers and bearings of the unground radial type to minimize the effects of inertia and drag.

The porous element 21 may be formed by conventional powder metallurgy techniques. It is within the ordinary capability of those skilled in the art to fabricate an element of selected porosity, pore size distribution, and permeability by selectively varying particle size and size distribution, compaction pressure, and sintering conditions.

To relate the pressure differential across the concentrically deflected member, as induced by operation of the invention, a well known relationship of engineering mechanics characterizing thin-walled cylindrical pressure vessels is employed. The particular relationship describes the circumferential stress in such a structure. By locally and concentrically deflecting a thin, flexible member with the device, the deflected portion of the member will simulate a portion of a cylindrical pressure vessel, provided the axial dimension of the device is substantially greater than the radius of curvature of the active surface of the device and provided that the space between the device and the member is relatively small. The tension may be determined by the relationship:

$$T = K(P_o - P_i) = K(\Delta P)$$

where $T$ is tension, $P_o$ is passageway static pressure, $P_i$ is opposing surface static pressure, and $K$ is a constant for a particular configuration of the surface over which the film is passed. Specifically, the pressure differential across the deflected portion of a member may be related to the tension (T) exerted on the member by the following relationship where the element over which the member is passed is circular:

$$T = \frac{(R \Delta P)}{t} t = R \Delta P$$

where $t$ is the thickness of the member in the deflection zone and $R$ is the radius of curvature of the deflected portion which may be taken as the radius of curvature of the pneumatically active surface of the porous element. Regarding the above equation, it will be apparent to those skilled in the art that the traditional derivation of the relationship assumes that $t$ is substantially less than $R$ and that the space between the device and the member is relatively small. If a sensor configuration is desired that does not meet this limitation, then it is within the skill of those in the art to derive the relationship.

If $R$ is selected as one inch, then an indication of the pressure differential in pounds per square inch will directly correspond to tension in pounds per inch. The component of the net tension acting on the member measured will be that component having a line of action perpendicular to the axial direction of the sensor. As a further convenience in operating the device, if the pressure exerted on the inner surface of the deflected member is other than atmospheric, as is usually the case, then it is desirable to employ a differential pressure measuring means such as a differential manometer (shown in FIG. 1) to indicate the pressure differential across the deflected portion of the member.

EXAMPLE 1

As a working example, a tension sensor constructed as herein above described was used to measure tension on an extruded bubble of plasticized PVC film. The PVC film was designated by Reynolds Metals Company as XP89/50 × 47.

The following readings were taken:
Film thickness at the sensor: 0.43 to 0.50 mils
Minimum air pressure to the sensor chamber determined to achieve a limiting discharge pressure: 4 PSIG
Air flow to the sensor at 4 PSIG: 0.4 SCFM
Operational air pressure to the sensor chamber: 15 PSIG Air flow to the sensor at 15 PSIG: 1.6 SCFM
Bubble diameter at the sensor: 29.6 inches
Film speed at the sensor: 100 FPM
Blow ratio: 3.2
Location of the sensor: 83 inches above the die outlet
Bubble Pressure: 0.4 – 0.5 inches of water column
Sensor Pressure: 6–7 inches of water column The porous element 21 was fabricated by the Mott Metallurgical Corporation from 316L stainless steel particles using powder metallurgy techniques. The element was characterized by a nominal 2 micron pore size and a permeability such that the air flow rate passing through the porous element was 1.6 SCFM/Ft.$^2$ at 15 PSIG. The sensor surface had a radius of curvature of 1 inch and an approximate total exposed area of 2.1 square inches. The constant pressure source of 15 PSIG was used to pressurize the chamber 23. Upon urging the sensor assembly slightly into contact with the moving film such that the axis of the assembly was perpendicular to the direction of motion of the film, a discharge static pressure of 6–7 inches of water column read. Note: In selecting an input pressure, it was found that in operating the device, as the input pressure is increased the discharge static pressure increases up to a limiting value proportional to the film tension.

While a present preferred embodiment of the invention has been illustrated and described, it will be recognized that the invention may be otherwise variously embodied and practiced within the scope of the following claims:

What is claimed is:

1. A device for measuring tension within a thin, flexible member, comprising:
an enclosure, a porous and permeable wall section having a roughly semi-cylindrical configuration forming said enclosure with a convex outer surface adapted for passing a gas flow, cylindrical extension members affixed to the ends of said enclosure, said extension members each having a radius about equal to the radius of said enclosure and each having a length such that the axial dimension of said device is substantially greater than its diametral dimension, said extension members being rotatably affixed to the ends of said enclosure so that relative movement between said device and said flexible member is facilitated, and a probe extending to the outer surface of said enclosure; and
means for sensing the static pressure at the outer surface of said porous wall section upon bringing the outer surface of said porous wall section in close proximity with said member as a gas flow enters said enclosure and exits through said porous wall section.

2. A device as specified in claim 1, wherein the surface material of said extension members is aluminum.

3. A method for determining tension within a thin, flexible member by utilizing a device which includes an enclosure, said enclosure having a porous and permeable wall section adapted for passing a gas flow therethrough with an axial dimension substantially smaller than its radial dimension, and a probe extending to the outer surface of said active surface of said enclosure, comprising the successive steps of:
providing a continuous flow of gas into said enclosure so that said gas flow exits from said enclosure through said porous wall section,
bringing said device into close proximity with said flexible member such that the axis of said device is perpendicular to the direction along which tension is to be measured and such that the gas flowing from said porous wall section concentrically and elastically deflects said member away from said section,
measuring the static pressure in the passageway defined by the outer surface of said porous wall section and the concentrically deflected surface of said member, and
computing the tension within said member according to the relationship $$T = R (\Delta P)$$

where $T$ is tension, $R$ is the radius of the active surface of the enclosure and $\Delta P$ is the pressure differential between the opposing surfaces of the flexible member.

4. A method for determining tension within a thin, flexible member by utilizing a device which includes an enclosure, said enclosure having a porous and permeable wall section adapted for passing a gas flow with a partially cylindrical outer surface, a probe extending to the outer surface of said porous wall section, and cylindrical axial extension members each having a radius about equal to the radius of curvature of said porous wall section and each having a length such that the axial dimension of said device is substantially greater than said radius, comprising the successive steps of:
providing a continuous flow of gas into said enclosure so that said gas flow exits from said enclosure through said porous wall section,
bringing said device into slight contact with said flexible member such that the axis of said device is perpendicular to the direction along which tension is to be measured and such that the gas flowing from said porous wall section urges said member away from said section,
measuring the static pressure in the passageway defined by the outer surface of said porous wall section and said member while increasing the gas pressure within said internal chamber until said passageway static pressure ceases to increase, and
computing the tension within said member according to the relationship $$T = K(P_o - P_i)$$

where $T$ is tension, $P_o$ is passageway static pressure, $P_i$ is opposing surface static pressure, and $K$ is a constant for a particular configuration of the active surface of the porous section.

5. A method as specified in claim 4, wherein said constant K is equal to the radius R of said porous wall section, such that the tension within the member is according to the relationship $$T = R\Delta P.$$

6. A device for measuring tension within a thin, flexible, tubular member comprising;
   an enclosure, said enclosure having a porous and permeable wall section for passing a gas flow therethrough;
   first means for sensing the static pressure at the outer surface of said porous wall section upon bringing the outer surface of said porous wall section in close proximity with and deflecting a portion of said tubular member upon providing gas flow into said enclosure with said gas flow exiting from said enclosure through said porous wall section;
   second means for sensing the static pressure on the inside of said tubular member; and
   a differential pressure measuring apparatus having said first means and second means operatively connected thereto and measuring the diferential pressure between said first and second means, said differential pressure being related to said tension within said member and being usable to determine same.

7. A device as specified in claim 6 wherein said porous wall section of said enclosure has a shape of a segment of a hollow cylinder and said tension is determined by the relationship $$T = K(P_o - P_i)$$

where $T$ is tension, $P_o$ is the static pressure sensed by said first means, $P_i$ is the static pressure sensed by said second means, and $K$ is a constant for a particular configuration of the active surface of said porous wall section.

8. A device as specified in claim 6 wherein said porous wall section of said enclosure has a shape of a segment of a hollow cylinder which has an outside radius $R$ and said tension is determined by the relationship $$T = R(\Delta P)$$

where $T$ is tension, $R$ is the radius of the outside surface of said segment, and $\Delta P$ is said differential pressure as determined by the differential pressure measuring apparatus.

* * * * *